(12) United States Patent
Meschter

(10) Patent No.: US 8,008,599 B2
(45) Date of Patent: Aug. 30, 2011

(54) METHOD FOR MANUFACTURING LAYERED ELEMENTS WITH INCISIONS

(75) Inventor: James C. Meschter, Portland, OR (US)

(73) Assignee: NIKE, Inc., Beaverton, OR (US)

(*) Notice: Subject to any disclaimer, the term of this patent is extended or adjusted under 35 U.S.C. 154(b) by 484 days.

(21) Appl. No.: 11/774,781

(22) Filed: Jul. 9, 2007

(65) Prior Publication Data

US 2009/0014424 A1    Jan. 15, 2009

(51) Int. Cl.
*B23K 26/38* (2006.01)

(52) U.S. Cl. ......................... 219/121.69; 36/45

(58) Field of Classification Search ............... 12/146 C; 36/45; 219/121.29
See application file for complete search history.

(56) References Cited

U.S. PATENT DOCUMENTS

| | | | |
|---|---|---|---|
| 4,126,500 A | 11/1978 | Palanos | |
| 5,185,511 A | 2/1993 | Yabu | |
| 5,589,090 A | 12/1996 | Song | |
| 5,883,356 A | 3/1999 | Bauer et al. | |
| 5,990,444 A | 11/1999 | Costin | |
| 6,046,427 A | 4/2000 | Richter et al. | |
| 6,252,196 B1 | 6/2001 | Costin et al. | |
| 6,299,962 B1 | 10/2001 | Davis et al. | |
| 6,492,616 B1 | 12/2002 | Tanaka et al. | |
| 6,495,237 B1 | 12/2002 | Costin | |
| 6,509,546 B1 | 1/2003 | Egitto et al. | |
| 6,633,019 B1 | 10/2003 | Gray | |
| 7,065,820 B2 * | 6/2006 | Meschter | 12/146 C |
| 2001/0055684 A1 | 12/2001 | Davis et al. | |
| 2002/0078594 A1 | 6/2002 | Sedlbauer | |
| 2002/0178621 A1* | 12/2002 | Darby | 36/140 |
| 2003/0107203 A1 | 6/2003 | Bauer et al. | |
| 2005/0153113 A1* | 7/2005 | Hseih et al. | 428/201 |

FOREIGN PATENT DOCUMENTS

| | | |
|---|---|---|
| EP | 0627330 A1 | 6/1993 |
| WO | 0046045 A3 | 8/2000 |
| WO | WO 00/46045 A3 * | 8/2000 |
| WO | WO 00/46045 A3 * | 10/2000 |
| WO | 2006115675 A1 | 11/2006 |

OTHER PUBLICATIONS

International Search Report and Written Opinion in PCT international application No. PCT/US2008/066924, mailed Oct. 27, 2008.
Notification of First Office Action and Text of the First Office Action in Chinese Application No. 200880024045.5, date of issuance Sep. 30, 2010.

* cited by examiner

*Primary Examiner* — Thien Tran
(74) *Attorney, Agent, or Firm* — Plumsea Law Group, LLC

(57) ABSTRACT

A manufacturing method may include forming incisions through an incision layer that is secured to a transfer layer. After defining the incisions, the incision layer is secured to a substrate layer, and the transfer layer is then separated from the incision layer. The manufacturing method may be applied to elements used in footwear, apparel, or a variety of other products.

31 Claims, 14 Drawing Sheets

US 8,008,599 B2

METHOD FOR MANUFACTURING LAYERED ELEMENTS WITH INCISIONS

BACKGROUND

Conventional articles of footwear generally include two primary elements, an upper and a sole structure. The upper is secured to the sole structure and forms a void on the interior of the footwear for comfortably and securely receiving a foot. The sole structure is secured to a lower surface of the upper so as to be positioned between the upper and the ground. In some articles of athletic footwear, for example, the sole structure may include a midsole and an outsole. The midsole may be formed from a polymer foam material that attenuates ground reaction forces to lessen stresses upon the foot and leg during walking, running, and other ambulatory activities. The outsole is secured to a lower surface of the midsole and forms a ground-engaging portion of the sole structure that is formed from a durable and wear-resistant material. The sole structure may also include a sockliner positioned within the void and proximal a lower surface of the foot to enhance footwear comfort.

The upper generally extends over the instep and toe areas of the foot, along the medial and lateral sides of the foot, and around the heel area of the foot. In some articles of footwear, such as basketball footwear and boots, the upper may extend upward and around the ankle to provide support for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance the comfort and adjustability of the footwear, and the upper may incorporate a heel counter to limit movement of the heel.

Various materials are conventionally utilized in manufacturing the upper. The upper of athletic footwear, for example, may be formed from multiple material layers that include an exterior layer, an intermediate layer, and an interior layer. The materials forming the exterior layer of the upper may be selected based upon the properties of stretch-resistance, wear-resistance, flexibility, and air-permeability, for example. With regard to the exterior layer, the toe area and the heel area may be formed of leather, synthetic leather, or a rubber material to impart a relatively high degree of wear-resistance. Leather, synthetic leather, and rubber materials may not exhibit the desired degree of flexibility and air-permeability for various other areas of the exterior layer of the upper. Accordingly, the other areas of the exterior layer may be formed from a synthetic textile, for example. The exterior layer of the upper may be formed, therefore, from numerous material elements that each impart different properties to the upper. The intermediate layer of the upper is conventionally formed from a lightweight polymer foam material that provides cushioning and enhances comfort. Similarly, the interior layer of the upper may be formed of a comfortable and moisture-wicking textile that removes perspiration from the area immediately surrounding the foot. In some articles of athletic footwear, the various layers may be joined with an adhesive, and stitching may be utilized to join elements within a single layer or to reinforce specific areas of the upper. Accordingly, the conventional upper has a layered configuration, and the individual layers each impart different properties to various areas of the footwear.

SUMMARY

In an example of a manufacturing method, incisions may be formed through an incision layer that is secured to a transfer layer. After defining the incisions, the incision layer is secured to a substrate layer, and the transfer layer is then separated from the incision layer.

In another example of a manufacturing method, a structure having an incision layer and a transfer layer that are secured together and substantially parallel to each other is provided. The incision layer has a first surface and an opposite second surface, with the second surface facing the transfer layer. Incisions that extend through the incision layer are defined, and the first surface of the incision layer is located adjacent to a substrate layer. The incision layer is then secured to the substrate layer, and the transfer layer is separated from the incision layer to expose the second surface.

The advantages and features of novelty characterizing aspects of the invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary and the following Detailed Description will be better understood when read in conjunction with the accompanying drawings.

DETAILED DESCRIPTION

Introduction

The following discussion and accompanying figures disclose various articles of footwear having an upper with a layered and incised configuration. In addition, various methods of manufacturing the upper are disclosed. The upper and the manufacturing methods are disclosed with reference to footwear having configurations that are suitable for running. Concepts associated with the upper and the manufacturing methods are not limited solely to footwear designed for running, however, and may be applied to a wide range of athletic footwear styles, including baseball shoes, basketball shoes, cross-training shoes, cycling shoes, football shoes, golf shoes, tennis shoes, soccer shoes, walking shoes, and hiking boots, for example. The concepts may also be applied to footwear styles that are generally considered to be non-athletic, including dress shoes, loafers, sandals, and work boots. The concepts associated with the upper and the manufacturing methods disclosed herein apply, therefore, to a wide variety of footwear styles. In addition to footwear, the concepts may also be applied to apparel and a variety of other products.

First Footwear Configuration

Figure 1:
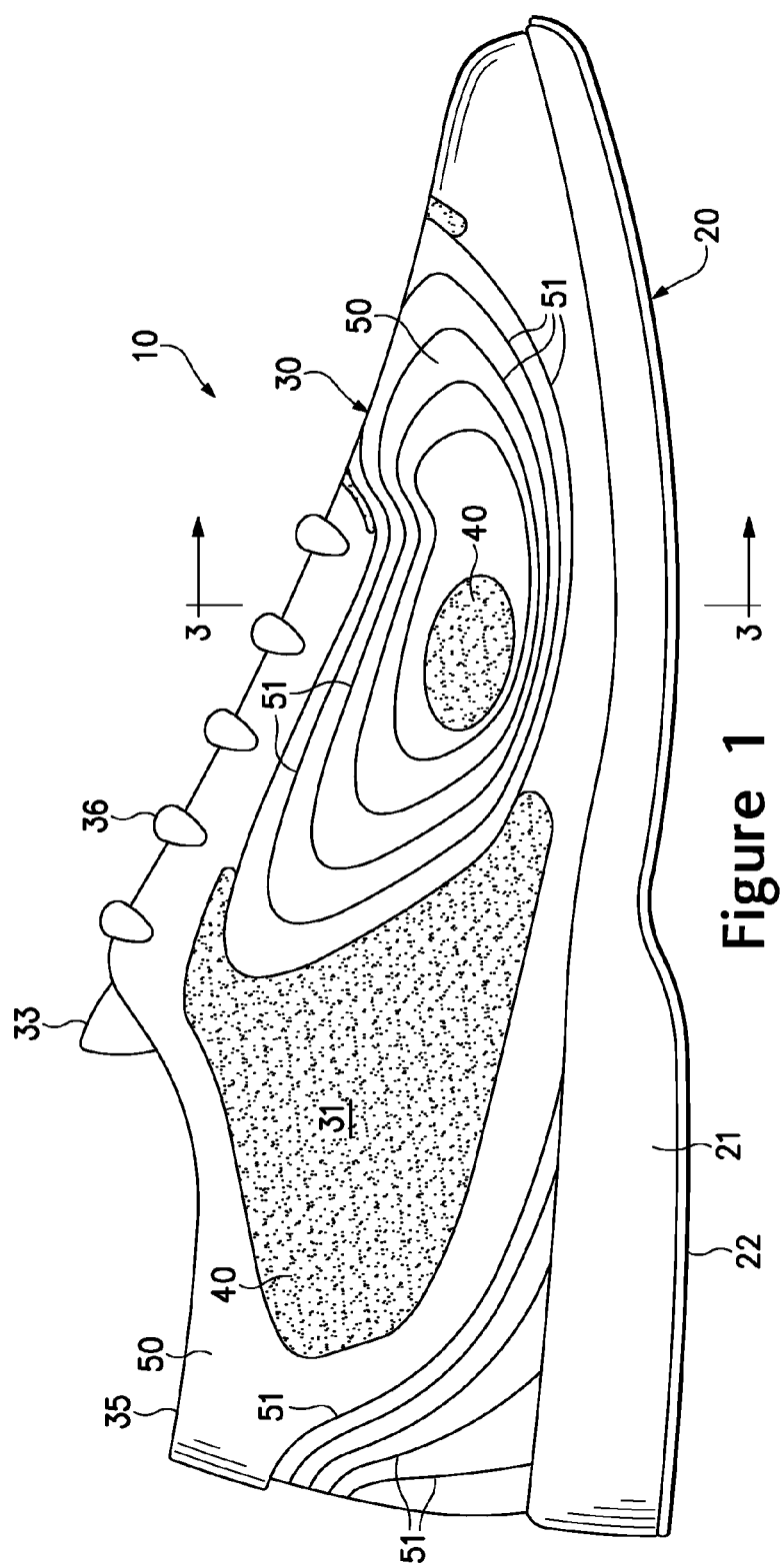
FIG. 1 is a lateral side elevational view of a first article of footwear.
Figure 2:
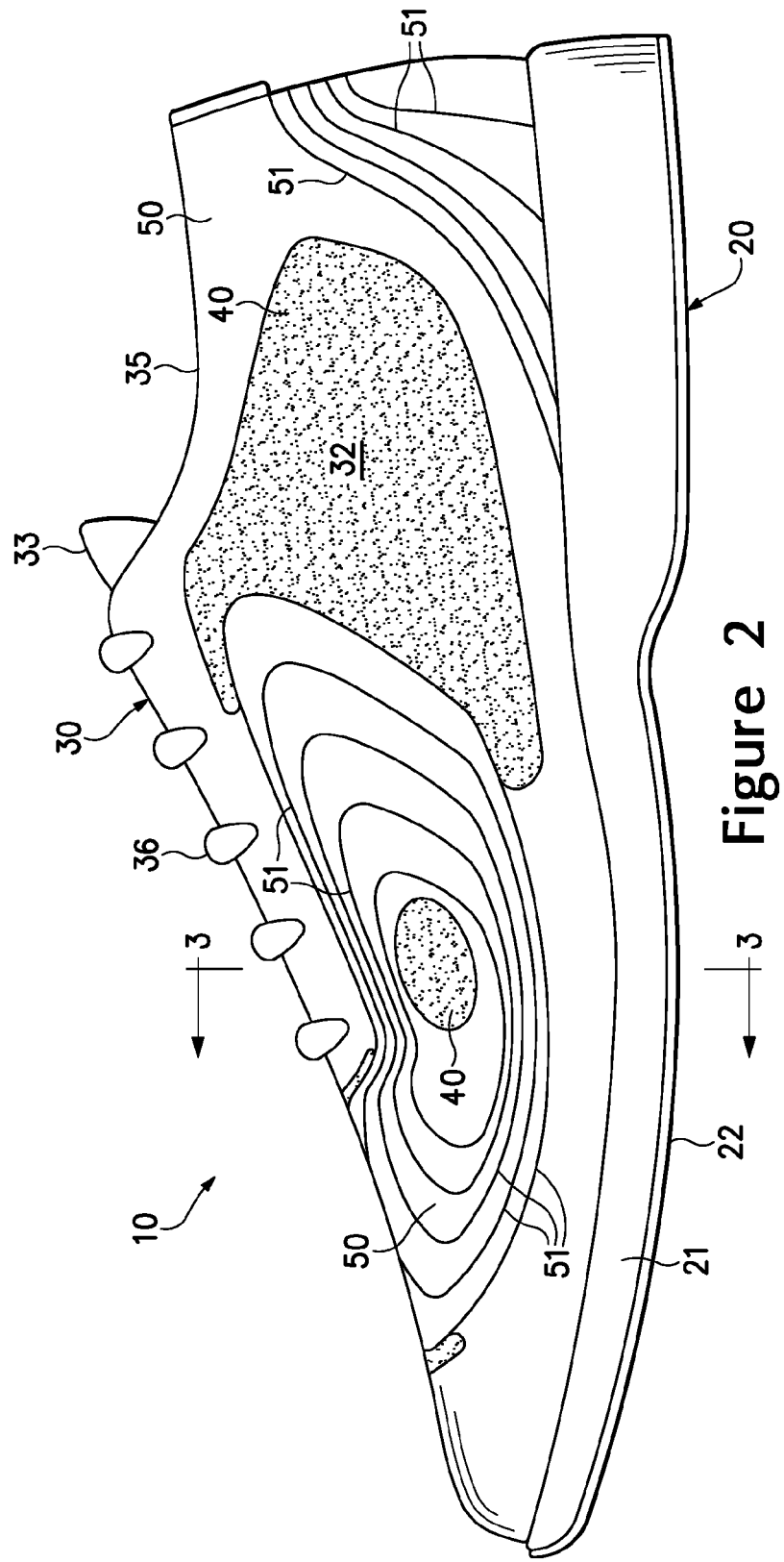
FIG. 2 is a medial side elevational view of the first article of footwear.
Figure 3:
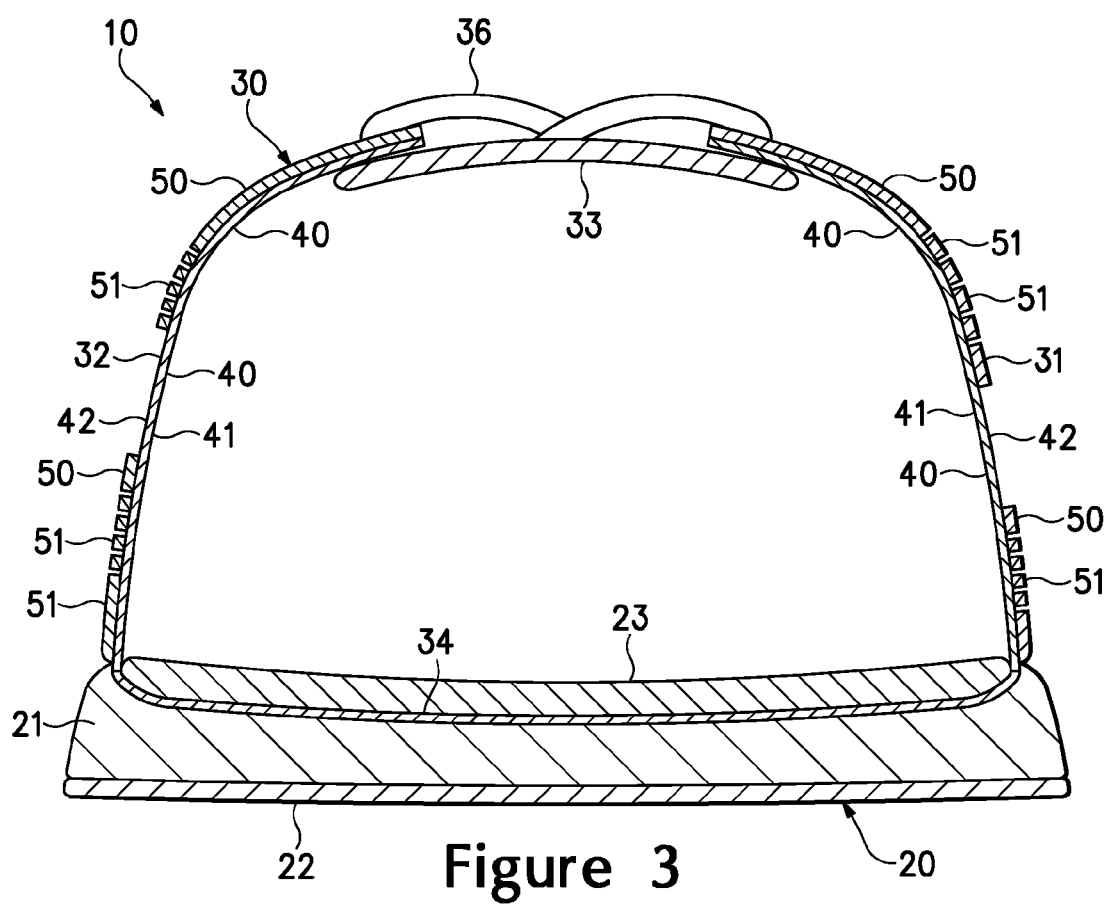
FIG. 3 is a cross-sectional view of the first article of footwear, as defined by section lines 3-3 in FIGS. 1 and 2.

An article of footwear 10 is depicted in FIGS. 1-3 as having a sole structure 20 and an upper 30. Sole structure 20 is secured to a lower area of upper 30 and is positioned to extend between the foot and the ground when footwear 10 is worn. The primary elements of sole structure 20 are a midsole 21, an outsole 22, and a sockliner 23. Midsole 21 may be formed from a polymer foam material, such as polyurethane or ethylvinylacetate, that attenuates ground reaction forces when compressed by the foot during walking, running, and other ambulatory activities. That is, midsole 21 reduces forces to effectively impart cushioning during use of footwear 10. Outsole 22 is secured to a lower surface of midsole 21 and provides a durable ground-engaging surface that may be textured to enhance the traction of footwear 10. A variety of wear-resistant materials, including rubber, may be utilized to form outsole 22. Sockliner 23 has the configuration of a relatively thin cushioning member and is positioned within upper 30 and proximal a plantar surface (i.e., lower surface) of the foot to enhance footwear comfort. Sole structure 30 may also include a variety of additional footwear elements that enhance the comfort or performance of footwear 10, including plates, moderators, fluid-filled chambers, lasting elements, or motion control members. In some configurations, any of these additional footwear elements may be located between midsole 21 and either of upper 30 and outsole 22, embedded within midsole 21, or encapsulated by the polymer foam material of midsole 21, for example.

Upper 30 is primarily formed from various material elements that define a void within footwear 10 for receiving and securing a foot relative to sole structure 20. The various material elements forming upper 30 combine to provide a structure with a lateral side 31, an opposite medial side 32, a tongue 33, and a lasting sock 34. Lateral side 31 extends through a longitudinal length of footwear 10 and is generally configured to contact and cover a lateral surface of the foot. A portion of lateral side 31 extends over an instep of the foot and overlaps a lateral side of tongue 33. Medial side 32 has a similar configuration that generally corresponds with a medial surface of the foot. A portion of medial side 32 also extends over the instep of the foot and overlaps an opposite medial side of tongue 33. In addition, an upper edge of lateral side 31, an upper edge of medial side 32, and a rear area of tongue 33 cooperatively form an ankle opening 35 located primarily in a heel region of footwear 10, thereby providing the foot with access to the void within upper 30.

Tongue 33 extends longitudinally along upper 30 and is positioned to contact the instep area of the foot. Side portions of tongue 33 may be secured to an interior surface of each of lateral side 31 and medial side 32. A lace 36 extends over tongue 33 and through apertures formed in lateral side 31 and medial side 32. Tongue 33 extends under lace 36 to separate lace 36 from the instep area of the foot. By increasing the tension in lace 36, the tension in lateral side 31 and medial side 32 may be increased so as to draw lateral side 31 and medial side 32 into contact with the foot. Similarly, by decreasing the tension in lace 36, the tension in lateral side 31 and medial side 32 may be decreased so as to provide additional volume for the foot within upper 30. This general configuration provides, therefore, a mechanism for at least partially adjusting the fit of upper 30 and accommodating various foot dimensions, particularly the girth of the foot. The tension in lace 36 may also be decreased in order to increase a size of ankle opening 35, thereby permitting the foot to freely enter and exit the void within upper 30.

A variety of materials are suitable for upper 30, including materials that are conventionally utilized in footwear uppers. Upper 30 may be formed, therefore, from combinations of natural or synthetic leather, natural or synthetic textiles, polymer sheets, polymer foams, mesh textiles, felts, non-woven polymers, or rubber materials, for example, that are joined through stitching or adhesive bonding. The materials may be selected and located to impart specific properties to different areas of upper 30. For example, rubber materials may be utilized in areas that may experience relatively high degrees of abrasion, mesh materials may be utilized in areas where breathability is beneficial, and polymer foams may be utilized in various areas to impart additional comfort. The materials may also structured to impart a layered configuration to upper 30. For example, a leather or synthetic leather may be utilized to form an exterior surface of upper 30 to impart a specific aesthetic appearance, natural or synthetic textiles may be utilized to form an interior surface (i.e., adjacent to the foot) to wick moisture away from the foot, and a polymer foam may be utilized between the leather and textile materials to enhance comfort. Accordingly, the various materials forming upper 30 may be selected to provide specific properties to different areas of upper 30, and the materials may be layered to impart multiple properties to a particular area.

Although a variety of materials and various layers of the materials may be utilized for upper 30, FIGS. 1-3 depict lateral side 31 and medial side 32 as having a configuration that includes two substantially parallel layers: a substrate layer 40 and an incision layer 50. Substrate layer 40 has an interior surface 41 and an exterior surface 42. Interior surface 41 faces inward and defines a portion of the void within upper 30, thereby being positioned to contact the foot or a sock when footwear 10 is worn. Exterior surface 42 is located opposite interior surface 41 and faces outward. Incision layer 50 is secured to exterior surface 42 and defines various incisions 51 that extend through incision layer 50 and expose portions of substrate layer 40 (i.e., exterior surface 42). In addition, incision layer 50 is absent from various areas of upper 30 to expose corresponding areas of substrate layer 40. In this configuration of footwear 10, therefore, substrate layer 40 forms portions of the interior surface of upper 30 (i.e., the void within upper 30), whereas both substrate layer 40 and incision layer 50 form portions of the exterior surface of upper 30.

Substrate layer 40 is depicted as a generally planar and continuous element. In some configurations of footwear 10, however, substrate layer 40 may be formed from multiple joined elements or may have a perforated or otherwise non-continuous structure. In comparison, incision layer 50 is formed from various discrete elements that are separated by incisions 51. As utilized herein, the term "incision" or variants thereof may is intended to encompass a space between material elements as well as a cut or slit in a single material element. Accordingly, two material elements may be separated by an incision when placed adjacent to each other such that a space is formed between edges of the material elements, or an incision may extend into a single material element to form a cut, slit, or space between different portions of the material element. With reference to footwear 10, incisions 51 form strips of material that extend in a generally diagonal direction in the heel regions of sides 31 and 32, and incisions 51 form concentric rings in areas of sides 31 and 32 generally corresponding with locations of the metacarpo-phalangeal joints (i.e., joints between the metacarpals and phalanges) of the foot. Although the strips of material and the concentric rings of incision layer 50 are depicted as separate elements of material, these separate elements may be joined or have areas that are not separated by incisions 51 in some configurations of footwear 10. That is, incision layer 50 may be a unitary (i.e., one-piece) material element in upper 30 that defines the various incisions 51.

Each of layers 40 and 50 may be formed from any combinations of the materials discussed above for conventional footwear uppers. As an example of a combination of materials that may be suitable for layers 40 and 50, substrate layer 40 may be formed from a material that is more stretchable than a material forming incision layer 50. More particularly, substrate layer 40 may be formed from a textile that incorporates elastane fibers, which are available from E.I. duPont de Nemours Company under the LYCRA™, and incision layer 50 may be formed from synthetic leather. In this configuration, substrate layer 40 and incision layer 50 impart a structure that selectively stretches or otherwise accommodates movement of the foot. In areas of sides 31 and 32 where both of layers 40 and 50 are present, the less stretchable configuration of incision layer 50 serves to inhibit stretch. In areas where incision layer 50 is absent, however, substrate layer 40 is unrestrained and may stretch. Accordingly, the presence of incisions 51 and other areas where incision layer 50 is absent exposes portions of substrate layer 40 and facilitates stretch in upper 30.

In manufacturing footwear 10, layers 40 and 50 may be formed separate from a remainder of upper 30 and then incorporated into upper 30. More particularly, layers 40 and 50 may be formed to have the general configuration depicted in FIG. 4, wherein lateral side 31 and medial side 32 are formed as a single composite element that includes both of layers 40 and 50. As described in greater detail below, layers 40 and 50 may be joined through stitching or adhesive bonding, and the various incisions 51 in layer 50 may be formed through a die cutting or laser cutting operation. In further configurations of upper 30, lateral side 31 may be formed separate from medial side 32 and subsequently joined, or sides 31 and 32 may each be formed from a plurality of joined elements.

Figure 4:
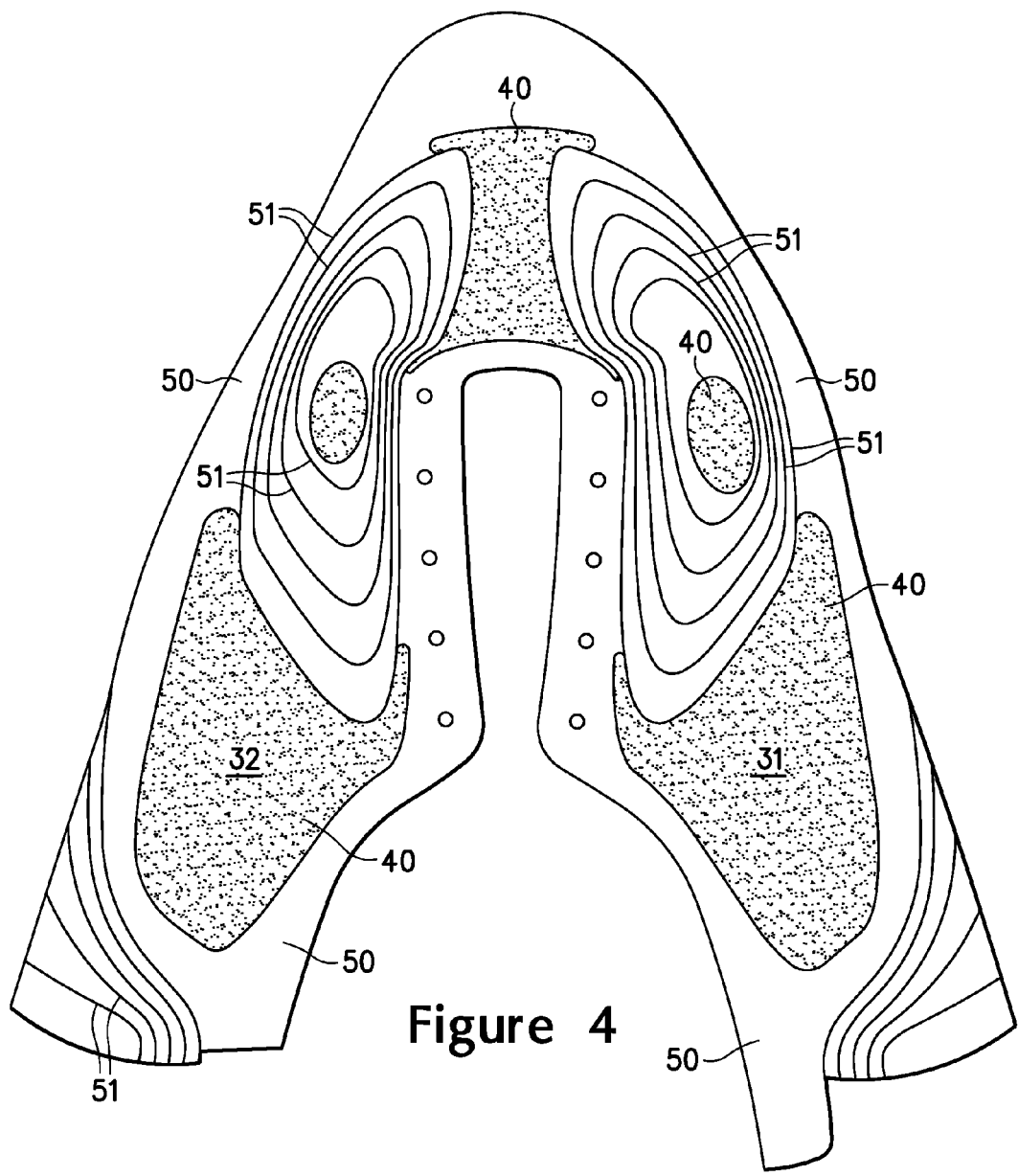
FIG. 4 is a top plan view of an element that forms a portion of an upper of the first article of footwear.

The configuration of layers 40 and 50 depicted in FIG. 4 intended to provide an example of the locations of incisions 51. In further configurations of footwear 10, incisions 51 may have a variety of regular and non-regular shapes. That is, incisions 51 may form straight lines, curved lines, wavy lines, ellipses, circles, triangles, squares, rectangles, pentagons, and hexagons, for example. Similarly, incisions 51 may form different shapes such that one is circular and another ring is hexagonal, for example. The number of rings or the shapes of the different elements formed by incisions 51 may also vary. In some configurations, incisions 51 may only form two strips of material or two rings, or incisions 51 may form a significant number of strips or rings. Although incision layer 50 is shown as being on the exterior of footwear 10, incision layer 50 may also be located in the interior of footwear 10. That is, incision layer 50 may be located to form the interior surface of upper 30, or incision layer 50 may be located between various material layers. The positions of incisions 51 may also vary. As discussed above, incisions 51 form strips of material in the heel region and rings in the area generally corresponding with locations of the metacarpo-phalangeal joints. In further configurations, the rings may be located on tongue 33 or in the heel region, for example. Accordingly, the locations of incision layer 50 and the specific locations of incisions 51 may vary significantly.

Second Footwear Configuration

Figure 5:
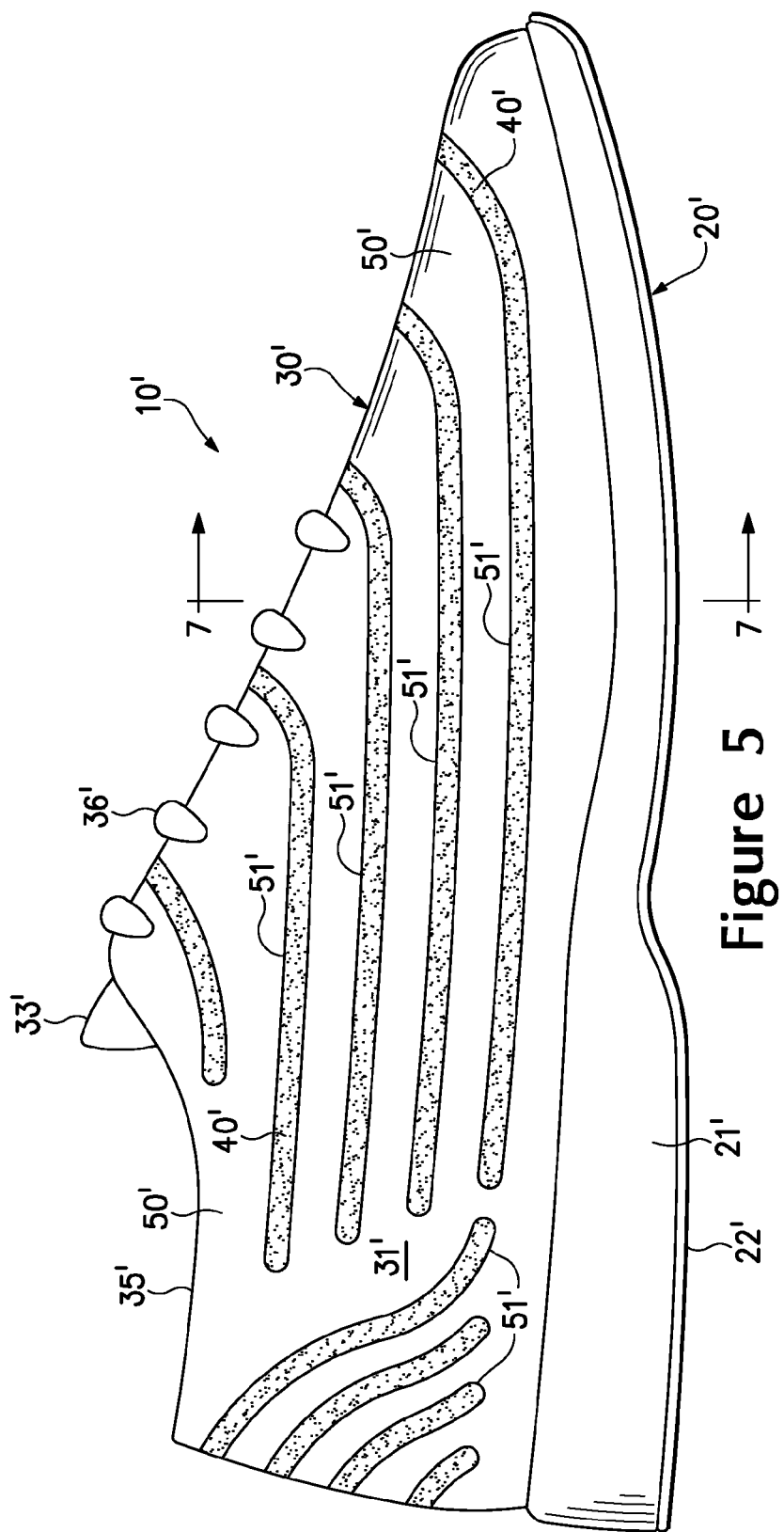
FIG. 5 is a lateral side elevational view of a second article of footwear.
Figure 6:
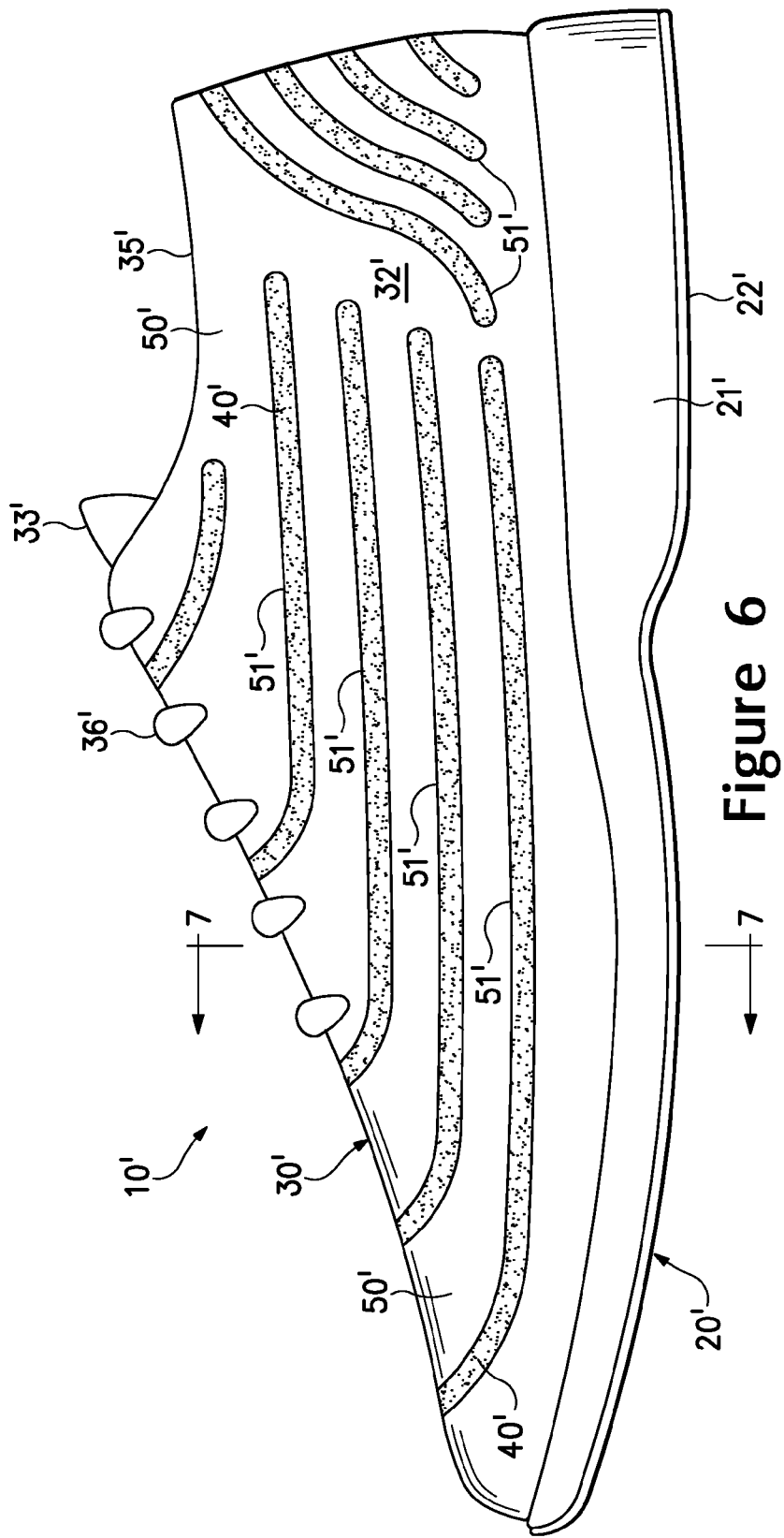
FIG. 6 is a medial side elevational view of the second article of footwear.
Figure 7:
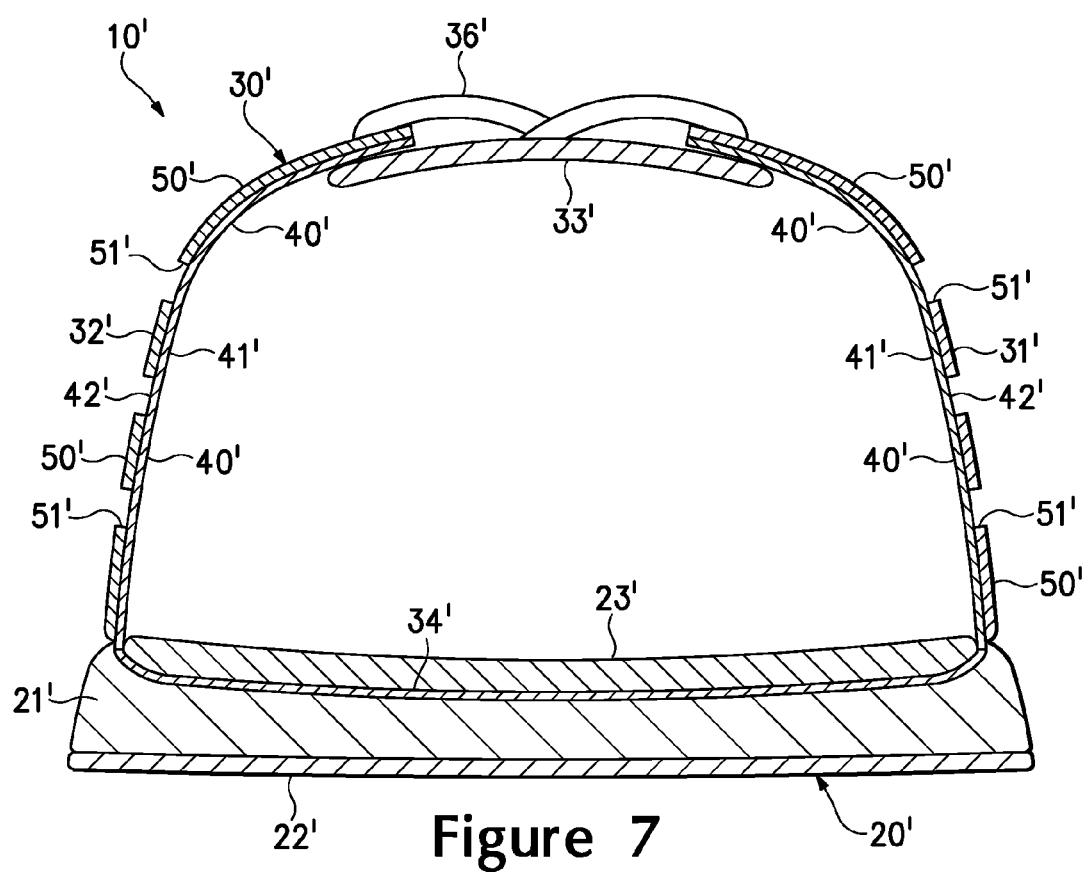
FIG. 7 is a cross-sectional view of the second article of footwear, as defined by section lines 7-7 in FIGS. 5 and 6.

With reference to FIGS. 5-7, an article of footwear 10' is depicted as having a sole structure 20' and an upper 30'. Sole structure 20' is secured to a lower area of upper 30' and includes a midsole 21', an outsole 22', and a sockliner 23', which are substantially similar to midsole 21, outsole 22, and sockliner 23 of sole structure 20. Upper 30' defines a void within footwear 10' and has various material elements that combine to provide a structure with a lateral side 31', an opposite medial side 32', a tongue 33', and a lasting sock 34'. An upper edge of lateral side 31', an upper edge of medial side 32', and a rear area of tongue 33' cooperatively form an ankle opening 35' located primarily in a heel region of footwear 10', and a lace 36' extends over tongue 33' and through apertures formed in lateral side 31' and medial side 32'.

A variety of materials are suitable for upper 30', including any of the materials discussed above for upper 30. Although a variety of materials and various layers of the materials may be utilized for upper 30', lateral side 31' and medial side 32' are depicted as having a configuration that includes two substantially parallel layers: a substrate layer 40' and an incision layer 50'. Substrate layer 40' has an interior surface 41' and an exterior surface 42'. Incision layer 50' is secured to exterior surface 42' and defines various incisions 51' that extend through incision layer 50' and expose portions of substrate layer 40' (i.e., exterior surface 42'). In addition, incision layer 50' is absent from various areas of upper 30' to expose corresponding areas of substrate layer 40'.

Substrate layer 40' is depicted as a generally planar and continuous element. In some configurations of footwear 10', however, substrate layer 40' may be formed from multiple joined elements or may have a perforated or otherwise non-continuous structure. Similarly incision layer 50' is depicted as a generally planar and continuous element that includes various incisions 51'. Whereas incision element 50 included separate strips and rings of material separated by incisions 51, incision element 50' is a unitary (i.e., one-piece) material element in upper 30' that defines the various incisions 51'. In other configurations, incision element 50' may have two or more separate portions that are separated by incisions 51', and some of the separate portions may have a unitary configuration with areas that are separated by other incisions 51'.

Each of layers 40' and 50' may be formed from any combinations of the materials discussed above for conventional footwear uppers. As an example of a combination of materials that may be suitable for layers 40' and 50', substrate layer 40' may be formed from a material that is more stretchable than a material forming incision layer 50'. The presence of incisions 51' exposes, therefore, portions of substrate layer 40' and facilitates stretch in upper 30'. More particularly, the various incisions 51' extending in a longitudinal direction may allow stretch around the girth of footwear 10', which limiting longitudinal stretch. In addition, the various incisions in the heel region of footwear 10' may impart stretch that accommodates heels with different dimensions. Accordingly, incisions 51' may be utilized to impart stretch to specific areas of upper 30' and in specific directions.

First Manufacturing Method

Figure 8A:
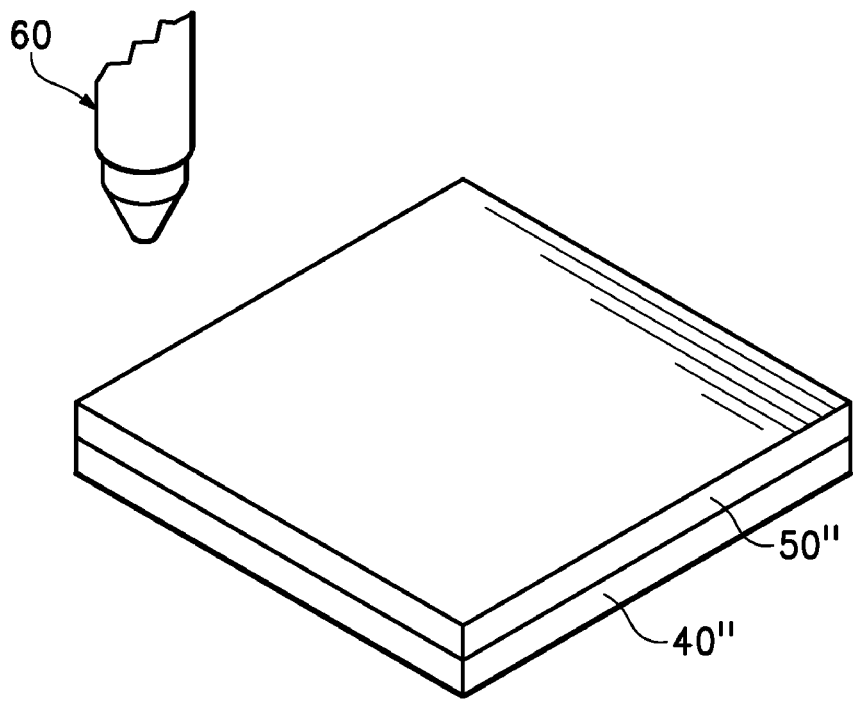
FIGS. 8A-8D are schematic perspective views depicting a first manufacturing method for a layered element of the first article of footwear and the second article of footwear.

A suitable method for forming incisions 51 and 51' will now be discussed with reference to FIGS. 8A-8D. A layered material having a substrate layer 40" and an incision layer 50" is depicted in FIG. 8A in proximity to laser apparatus 60. In general, the properties and configuration of substrate layer 40" are substantially identical to substrate layers 40 and 40', and the properties and configuration of incision layer 50" are substantially identical to incision layers 50 and 50'. The manner in which an incision 51" may be formed in incision layer 50" is similar, therefore, to the manner in which incisions 51 and 51' may be respectively formed in incision layers 50 and 50'. As discussed in greater detail below, the method generally involves utilizing a laser apparatus 60 to form incision 51" through incision layer 50" and to a prescribed depth. As an alternative to laser apparatus 60, a die cutting operation or other type of cutting operation may be utilized to form incision 51".

Laser apparatus 60 has the capacity to produce a laser beam 61 of variable intensity to form incision 51". More particularly, laser apparatus 60 may adjust the power of laser beam 61 to form incision 51" in a manner that extends through incision layer 50" without significantly extending into substrate layer 40". In addition to adjusting the power of laser beam 61 to vary the depth of incision 51", the focus of laser beam 61 and the velocity of laser beam 61 relative to layers 40" and 50" may be varied. An example of a suitable laser apparatus 60 is any of the conventional $CO_2$ or Nd:YAG laser apparatuses.

Figure 8B:
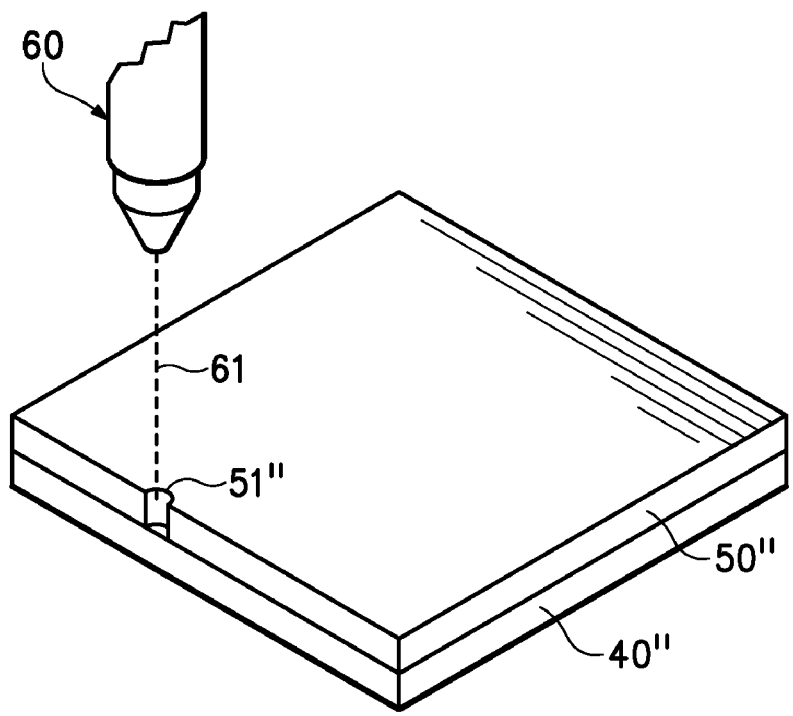
Figure 8C:
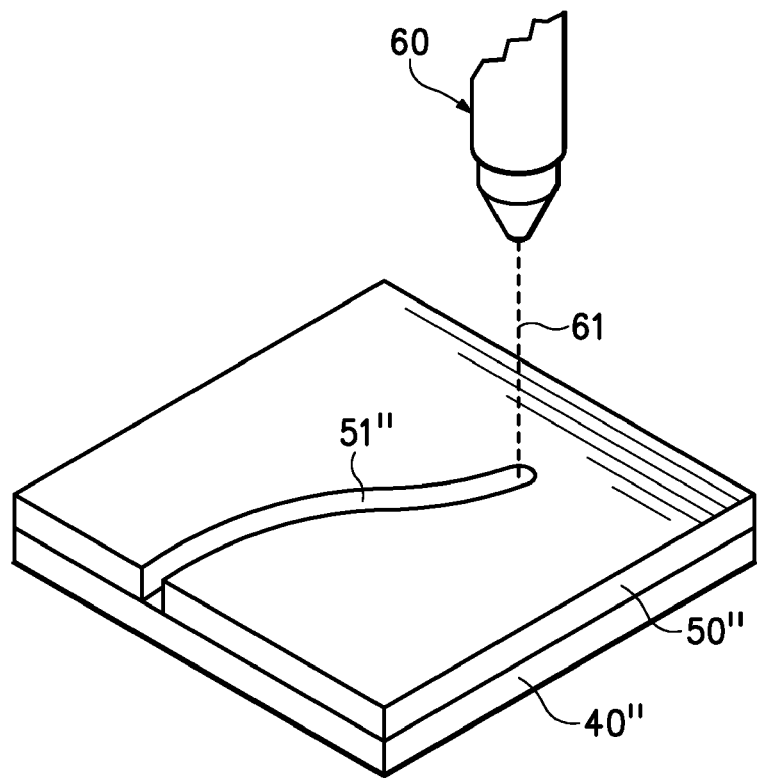
Figure 8D:
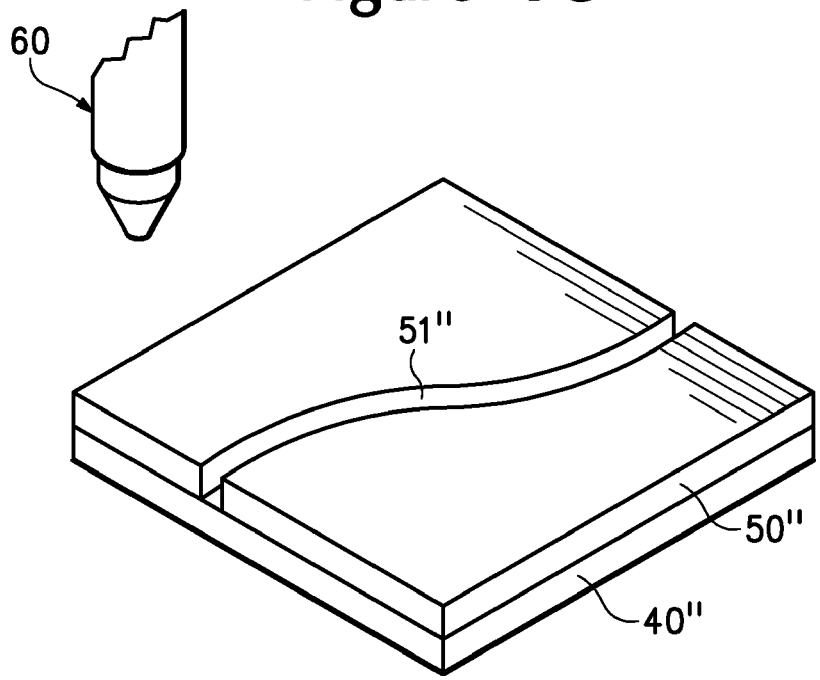

Laser apparatus 60 directs laser beam 61 toward layers 40" and 50" to begin forming incision 51", as depicted in FIG. 8B. Laser apparatus 60 then moves laser beam 61 relative to layers 40" and 50" to shape incision 51", as depicted in FIG. 8C. In the configuration depicted in FIG. 8C, incision 51" has the general configuration of the various incisions 51' in footwear 10'. In order to form incision 51" to have the general configuration of the various incisions 51 in footwear 10, laser beam 61 then continues to move relative to layers 40" and 50" to continue the formation of incision 51" and divide incision layer 50" into two separate elements of material, as depicted in FIG. 8D. As with the strips of material or the rings in upper 30, therefore, incision 51" in FIG. 8D forms separate areas of incision layer 50".

Incision 51" has a depth that extends only through incision layer 50", thereby exposing substrate layer 40". Factors that determine the depth of incision 51" include the power output of laser apparatus 60, the focus of laser beam 61, the velocity of laser beam 61 relative to layers 40" and 50", the specific materials forming incision layer 50", and the thickness of incision layer 50". For materials such as synthetic leather, leather, polymer sheets, and polymer textiles, which are often incorporated into footwear uppers, the power of laser beam 61 may be in a range of 0.25 to 25 watts, for example. Whereas materials such as leather, synthetic leather, and textiles may require a relatively minor power output to form incision 51", other materials such as high-density polymers and metals may require greater power to form incision 51" to the same depth. Accordingly, many factors are considered in determining the proper power, focus, and/or velocity of laser beam 61 for forming incision 51" to the prescribed depth.

Laser apparatus 60 may include an emitter for laser beam 61 that moves relative to layers 40" and 50" and forms incisions 51" in incision layer 50". That is, the shape of incision 51" may be controlled by movements of laser apparatus 60 relative to incision layer 50". Alternately, laser beam 61 may reflect off of one or more movable or pivotable mirrors, and the shape of incision 51" may be controlled by movements of the mirrors.

Laser beam 61 heats selected areas of incision layer 50" and forms incision 51" by burning, incinerating, or otherwise ablating the selected areas of incision layer 50". In order to prevent other areas of incision layer 50" from unintentionally burning, incision 51" may be formed in the presence of a non-combustible fluid, such as carbon dioxide or nitrogen. That is, laser apparatus 60 may be configured to emit a non-combustible fluid when laser beam 61 is forming incision 51".

The disclosure of footwear 10 above included a discussion of various considerations related to the shape and positions of incisions 51 that were formed in upper 30. Similarly, the disclosure of footwear 10' above included a discussion of various considerations related to the shape and positions of incisions 51' that were formed in upper 30'. Utilizing these considerations, the manufacturing method discussed relative to FIGS. 8A-8D may be modified to form the various incisions 51 and 51'. For example, concepts associated with the manufacturing method may be utilized to form an element having the configuration depicted in FIG. 4. That is, laser apparatus 60 may be utilized to form an element that includes both layers 40 and 50 and includes the various incisions 51, and the same general procedure may be utilized to form an element that includes both layers 40' and 50' and includes the various incisions 51'. Accordingly, the general concepts discussed relative to FIGS. 8A-8D may be utilized to form elements suitable for footwear 10 and footwear 10'.

Second Manufacturing Method

The first manufacturing method discussed above provides a suitable process for forming any of incisions 51, 51' and 51". Whereas incision 51" extends through incision layer 50", incision 51" does not generally extend into substrate layer 40". As noted, various factors determine the depth of incisions 51", including variations in power output, velocity, and material properties. As an example, slight increases in the thickness of incision layer 50" may prevent laser beam 61 from cutting entirely through incision layer 50", or slight decreases in the thickness of incision layer 50" may cause laser beam to ablate portions of substrate layer 40". While the first method may be suitable for forming incision 51", the first method may require relatively strict quality controls to ensure a proper depth of incision 51". As an alternative to the first manufacturing method, the second manufacturing method discussed in greater detail below joins layers 40" and 50" following the formation of incision 51" to ensure that substrate layer 40" is not burned, incinerated, or otherwise ablated during the manufacturing process.

Figure 9A:
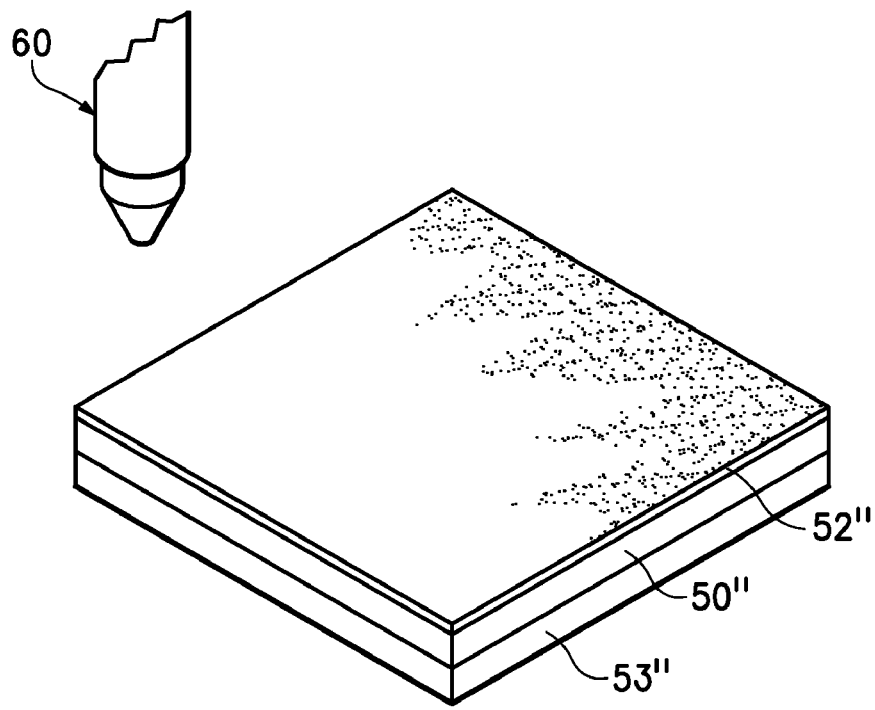
FIGS. 9A-9H are schematic perspective views depicting a second manufacturing method for the layered element of the first article of footwear and the second article of footwear.

Referring to FIG. 9A, a stratified material that includes an adhesive layer 52", incision layer 50", and a transfer layer 53" that are substantially parallel to each other is depicted. Adhesive layer 52", which may be absent in some configurations, includes an adhesive or other material that may be utilized to join incision layer 50" to substrate layer 40". Transfer layer 53" is secured to incision layer 50" in a non-permanent manner and may be formed from paper, textiles, polymers, metals, or a variety of other materials.

Figure 9B:
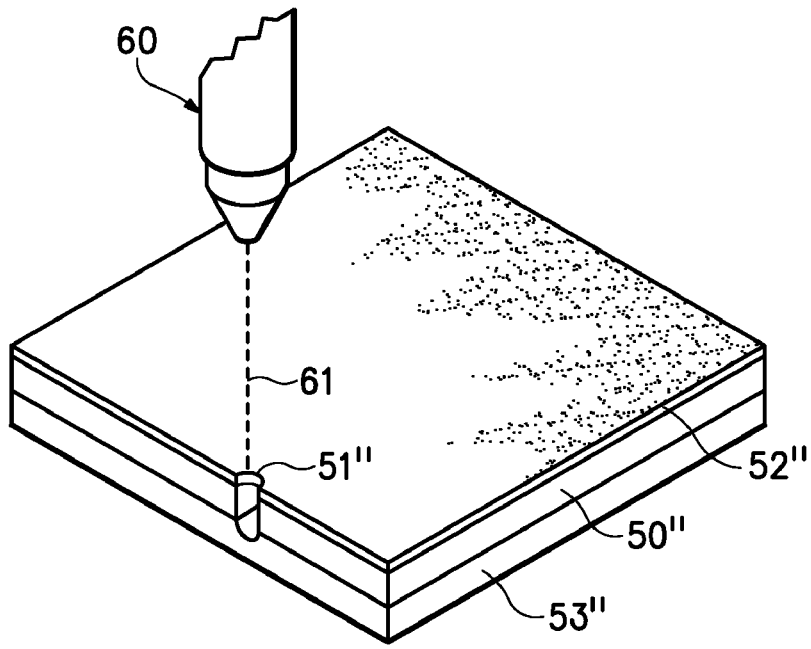
Figure 9C:
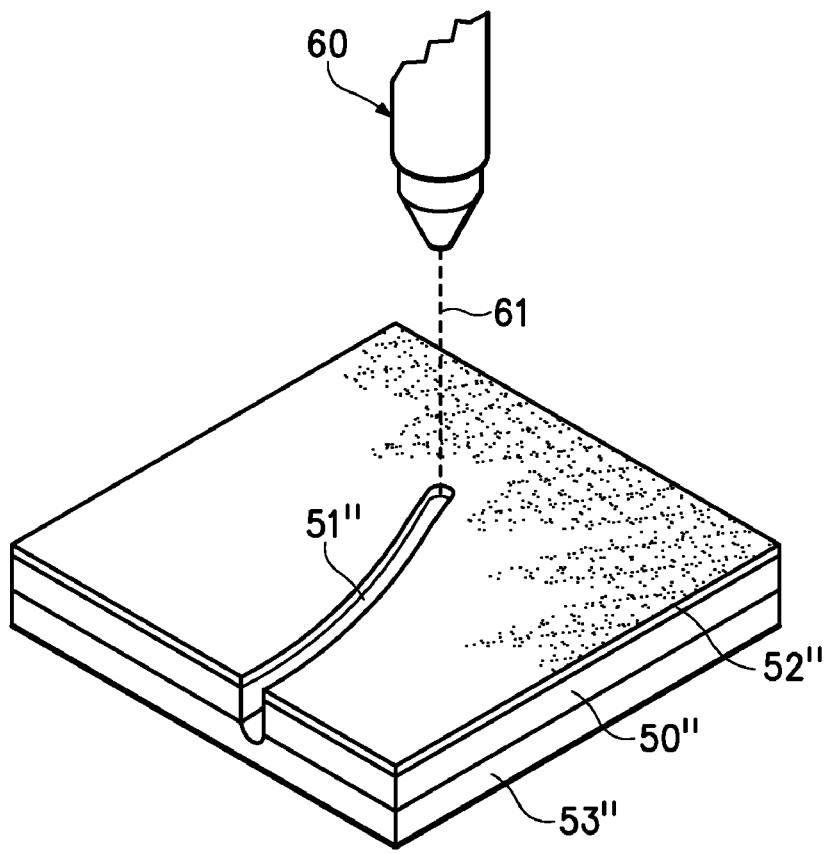
Figure 9D:
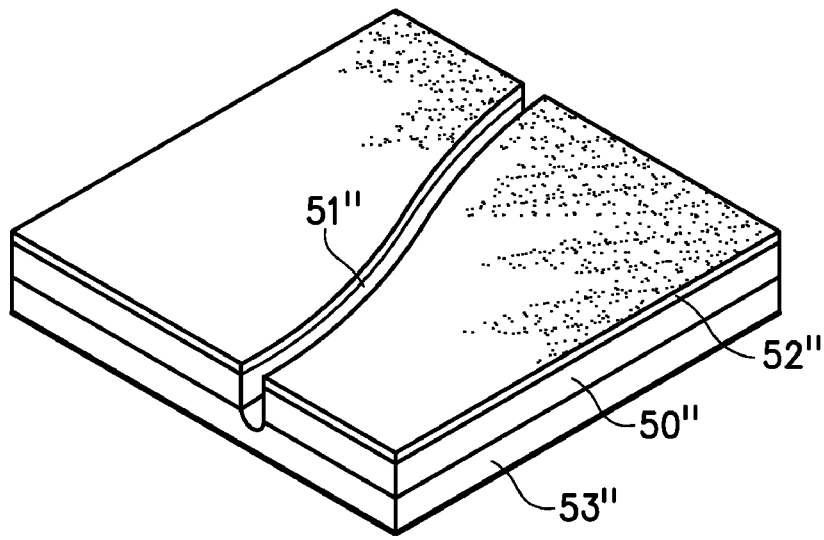

Laser apparatus 60 directs laser beam 61 toward layers 50", 52", and 53" to begin forming incision 51", as depicted in FIG. 9B, by ablating the thickness of adhesive layer 52", incision layer 50", and a portion of transfer layer 53". Laser apparatus 60 then moves laser beam 61 relative to layers 50", 52", and 53" to shape incision 51", as depicted in FIG. 9C. At this stage, incision 51" has the general configuration of the various incisions 51' in footwear 10'. Laser beam 61 then continues to move relative to layers 50", 52", and 53" to complete the formation of incision 51" and divide adhesive layer 52" and incision layer 50" into two separate elements of material, as depicted in FIG. 9D. As with the strips of material or the rings in upper 30, therefore, incision 51" in FIG. 9D forms separate areas of incision layer 50".

Figure 9E:
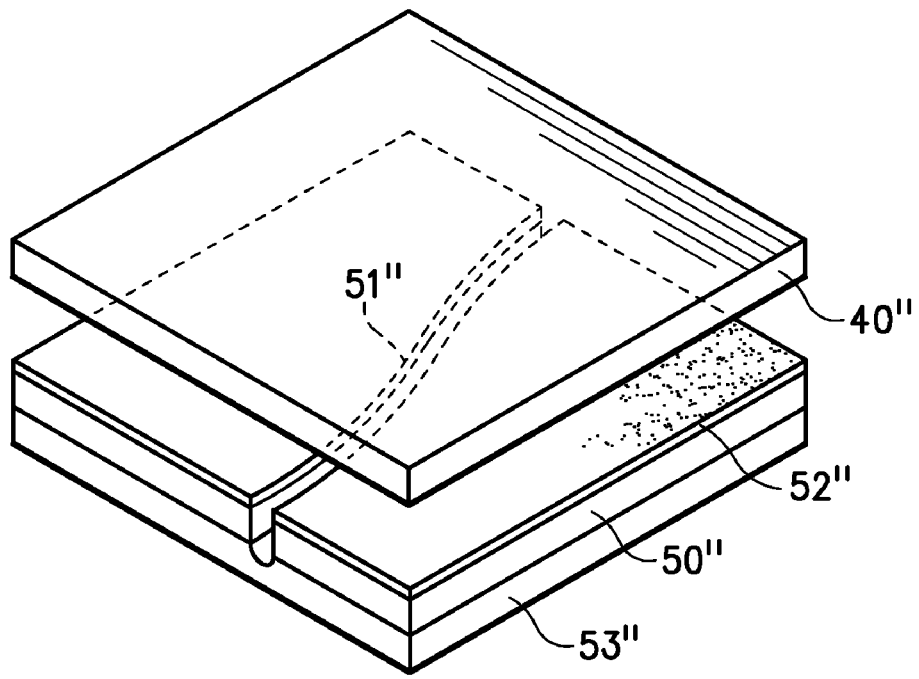
Figure 9F:
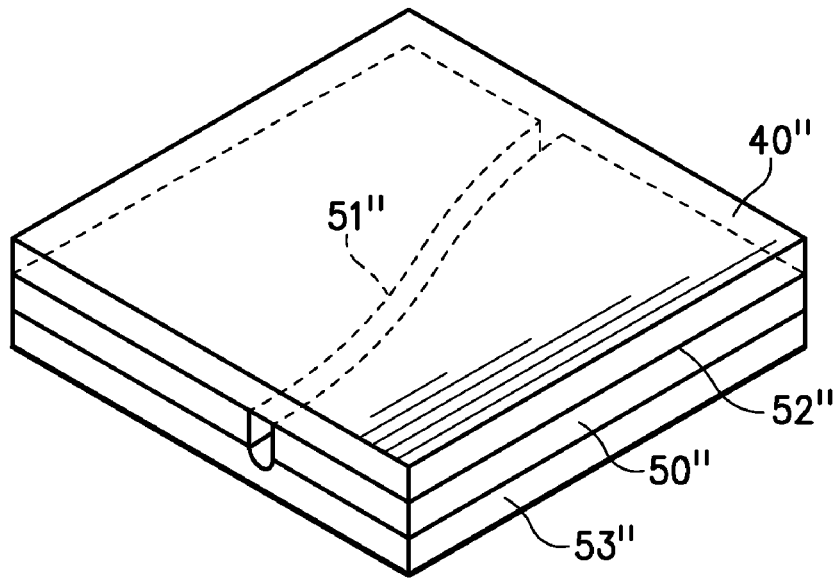
Figure 9G:
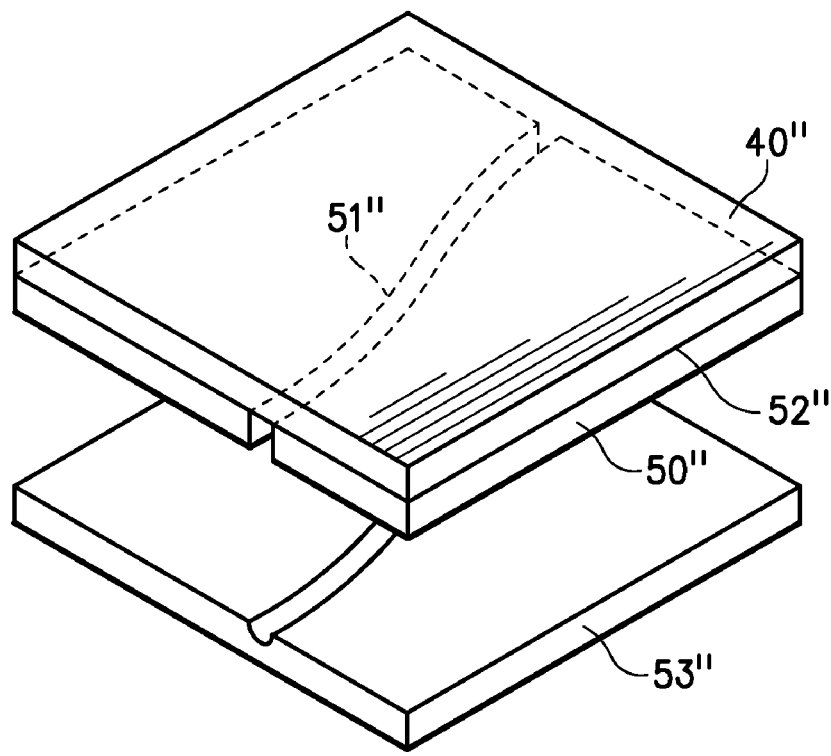
Figure 9H:
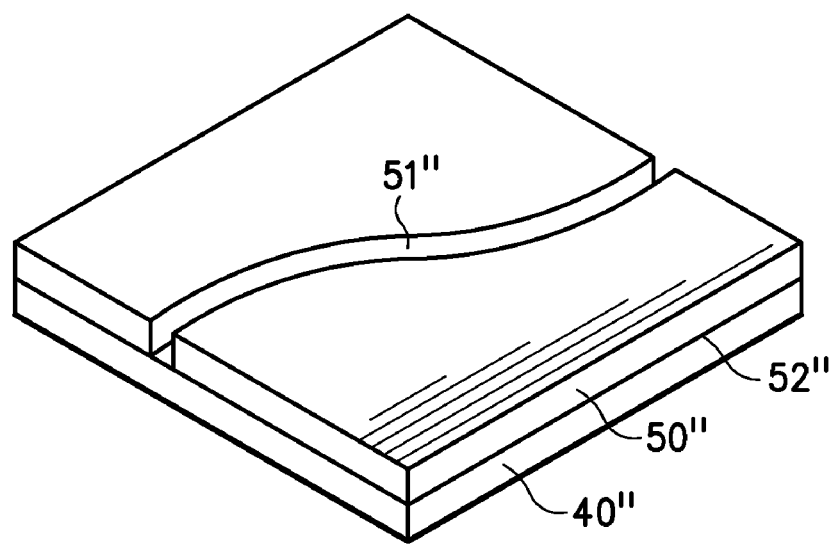

Once incision 51" is formed, substrate layer 40" is positioned adjacent to adhesive layer 52", as depicted in FIG. 9E. Substrate layer 40" is then brought into contact with adhesive layer 52", as depicted in FIG. 9F, to bond substrate layer 40" to incision layer 50". That is, adhesive layer 52" serves to bond layers 40" and 50" to each other. As noted above, transfer layer 53" is secured to incision layer 50" in a non-permanent manner and may, therefore, be removed, as depicted in FIG. 9G. The combination of layers 40" and 50" may then be turned over, as in FIG. 9H, to form a structure that is similar to the structure formed in FIG. 8D.

Although adhesive layer 52" is depicted as being present in the method discussed above, adhesive layer 52" may be absent during the cutting process. When an adhesive is utilized to join layers 40" and 50", the adhesive may be applied after the cutting process. As an alternative, a heat bonding process that does not involve the use of an adhesive may also be utilized to join layers 40" and 50". In some configurations, the adhesive may be applied to substrate layer 40" prior to joining layers 40" and 50". Accordingly, adhesive layer 52" may be added at any stage of the manufacturing method, and adhesive layer 52" may be entirely absent in some manufacturing methods.

As discussed above, the first method may require relatively strict quality controls to ensure a proper depth of incision 51". That is, relatively strict quality controls may be necessary to ensure that substrate layer 40" is not partially burned, incinerated, or otherwise ablated. In the second method, however, the power output of laser apparatus 60 may be selected to extend entirely through the depth of incision layer 50" and at least partially or entirely through transfer layer 53". Given that transfer layer 53" is removed and discarded or recycled, portions of transfer layer 53" may be burned, incinerated, or otherwise ablated without adversely affecting the resulting product.

A further benefit of the second manufacturing method is that transfer layer 53" may be utilized to hold the separate elements of incision layer 50 together during subsequent manufacturing steps, including the bonding of layers 40" and 50". In circumstances where transfer layer 53" is not entirely cut by laser apparatus 60, transfer layer 53" will remain dimensionally-stable as the combination of layers 50", 52", and 53" is moved away from laser apparatus 60. That is, the presence of transfer layer 53", when not entirely cut through, ensures that the various portions of incision layer 50" do not move relative to each other during transport or during bonding with substrate layer 40".

CONCLUSION

Footwear 10, footwear 10', and the manufacturing methods disclosed material elements formed from two layers and having incisions through one of the layers. Other footwear configurations, various articles of apparel, or other products may incorporate similar structures. In addition, the footwear configurations, articles of apparel, or other products may also incorporate elements having more than two layers with incisions that extend through more than one layer, as disclosed in U.S. Pat. No. 7,065,820 to Meschter. Similar manufacturing methods may be utilized to form these elements. For example, a laser apparatus may form incisions in two separate layered structures and the layered structures may be subsequently combined to form a layered structure with incisions through multiple layers. Accordingly, the general concepts discussed above may be applied to a range of products and to products with multi-layered structures.

The manufacturing methods discussed above are disclosed with reference to a process for forming an upper for an article of footwear. In addition to footwear uppers, the manufacturing methods discussed above may be applied to sole structures. For example, concepts associated with the manufacturing methods may be utilized to form incisions in an outsole to provide flexibility to the outsole. The incisions may also impart greater traction or permeability (i.e., for air or water) to the sole structure.

Figure 10:
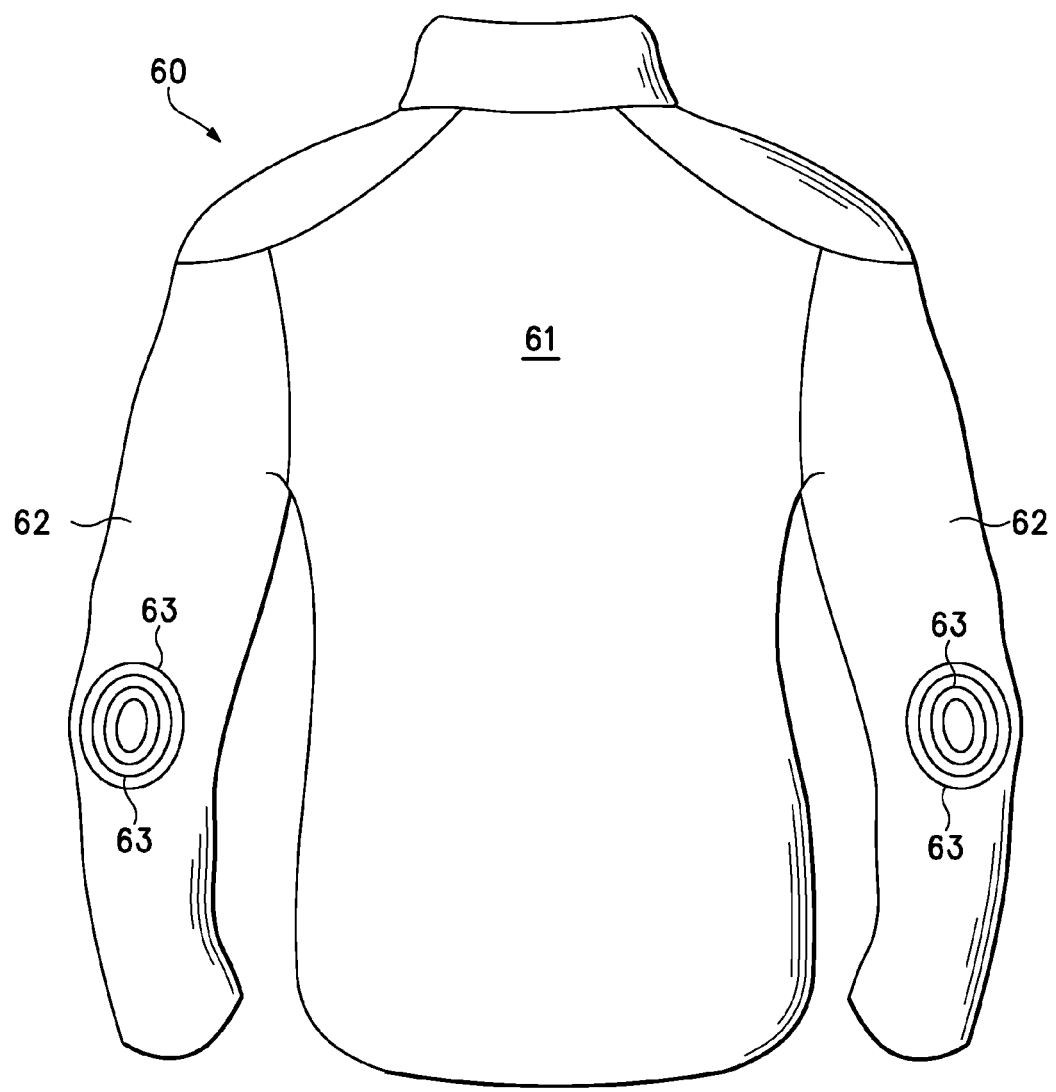
FIG. 10 is a rear elevational view of an article of apparel.

In addition to footwear, the concepts associated with the manufacturing methods may be applied to apparel and a variety of other products. Referring to FIG. 10, an article of apparel 60 with the configuration of a shirt is depicted as having a torso region 61 and two sleeves 62. Each of sleeves 62 may be formed from a stratified material, and the general process discussed above may be utilized to form incisions 63 in the stratified material. Although incisions 63 may be located anywhere in apparel 60, incisions 63 are depicted as being located to correspond with elbows of the wearer to impart stretch or greater freedom of movement when arms of the wearer are bent. In addition to a shirt, concepts discussed above may be applied to headwear, jackets, pants, or socks, for example.

The invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

The invention claimed is:

1. A method comprising steps of:
   providing a structure having a first layer and a second layer that are secured together and substantially parallel to each other;
   forming an incision that extends through the first layer, the incision extending at least partially into the second layer;
   locating the first layer adjacent to a third layer such that the first layer is substantially located between the second layer and the third layer;
   securing the first layer to the third layer; and
   separating the second layer from the first layer.

2. The method recited in claim 1, wherein the step of forming the incision includes utilizing a laser.

3. The method recited in claim 1, further including a step of placing an adhesive on a surface of the first layer that faces away from the second layer.

4. The method recited in claim 3, wherein the step of securing includes utilizing the adhesive to join the first layer to the third layer.

5. The method recited In claim 3, wherein the step of placing the adhesive is performed prior to the step of forming the incision.

6. The method recited in claim 1, further including a step of selecting at least one of the first layer and the third layer to be a textile material.

7. The method recited in claim 1, further including a step of incorporating the first layer and the third layer into an article of footwear.

8. A method comprising steps of:
   providing a structure having an incision layer and a transfer layer that are secured together and substantially parallel to each other, the incision layer having a first surface and an opposite second surface, the second surface facing the transfer layer;
   forming incisions that extend through the incision layer, the incisions extending at least partially into the transfer layer;
   locating the first surface of the incision layer adjacent to a substrate layer;

securing the incision layer to the substrate layer; and separating the transfer layer from the incision layer to expose the second surface.

9. The method recited in claim 8, wherein the step of forming the incisions includes utilizing a laser.

10. The method recited in claim 8, further including a step of placing an adhesive on the first surface.

11. The method recited in claim 10, wherein the step of securing includes utilizing the adhesive to join the incision layer to the substrate layer.

12. The method recited In claim 10, wherein the step of placing the adhesive is performed prior to the step of forming the incisions.

13. The method recited in claim 8, further including a step of selecting at least one of the incision layer and the substrate layer to be a textile material.

14. The method recited in claim 8, further including a step of incorporating the incision layer and the substrate layer into an article of footwear.

15. A method of manufacturing an upper for an article of footwear, the method comprising steps of:
providing a structure having an incision layer and a transfer layer that are secured together and substantially parallel to each other, the incision layer having a first surface and an opposite second surface, the second surface facing the transfer layer, and at least one of the incision layer and the substrate layer being a textile material;
placing an adhesive on the first surface;
forming incisions with a laser that extend through the adhesive and the incision layer;
locating the first surface of the incision layer adjacent to a substrate layer such that the adhesive is located between the incision layer and the substrate layer;
securing the incision layer to the substrate layer with the adhesive;
separating the transfer layer from the incision layer to expose the second surface; and
incorporating the incision layer, the adhesive, and the substrate layer into the upper of the article of footwear so that the second surface forms a portion of an exterior surface of the footwear.

16. The method recited in claim 15, wherein the step of forming the incisions further includes extending at least a portion of the incisions into the transfer layer.

17. The method recited In claim 15, wherein the step of placing the adhesive is performed following the step of forming the incisions.

18. A method of manufacturing an upper for an article of footwear, the method comprising steps of:
utilizing a laser to form a plurality of incisions in a stratified material, the stratified material having a plurality of layers that include a first layer, a second layer, and a third layer, the second layer being located between the first layer and the third layer, the incisions extending through at least the first layer and the second layer, and at least one of the second layer and a fourth layer being a textile material;
securing the stratified material to the fourth layer with the first layer;
separating the third layer from a remainder of the stratified material; and
incorporating the first layer, the second layer, and the fourth layer into the upper of the article of footwear.

19. The method recited in claim 18, further including a step of structuring the stratified material to locate the second layer adjacent to the third layer.

20. The method recited in claim 18, further including a step of selecting the first layer to be an adhesive material.

21. A method comprising steps of:
utilizing a laser to form a plurality of incisions through an incision layer that is secured to a transfer layer, each of the plurality of incisions being one of a cut or a slit;
securing the incision layer to a substrate layer after forming the incisions; and
separating the transfer layer from the incision layer after securing the incision layer to the substrate layer.

22. The method recited in claim 21, wherein the step of utilizing the laser includes forming the incision to extend at least partially into the transfer layer.

23. The method recited in claim 21, further including a step of placing an adhesive on a surface of the incision layer that faces away from the transfer layer.

24. The method recited in claim 23, wherein the step of securing includes utilizing the adhesive to join the incision layer to the substrate layer.

25. The method recited In claim 23, wherein the step of placing the adhesive is performed prior to the step of utilizing the laser.

26. The method recited in claim 21, further including a step of selecting at least one of the Incision layer and the substrate layer to be a textile material.

27. The method recited in claim 21, further including a step of incorporating the incision layer and the substrate layer into an article of footwear.

28. A method comprising steps of:
utilizing a cutting apparatus to form a plurality of incisions through an incision layer that is secured to a transfer layer, each of the plurality of incisions being one of a cut or a slit;
securing the incision layer to a substrate layer after forming the incisions; and
separating the transfer layer from the incision layer after securing the incision layer to the substrate layer.

29. The method recited in claim 28, wherein the step of utilizing the cutting apparatus includes forming the incision to extend at least partially into the transfer layer.

30. The method recited in claim 28, further including a step of placing an adhesive on a surface of the incision layer that faces away from the transfer layer.

31. The method recited in claim 30, wherein the step of securing includes utilizing the adhesive to join the incision layer to the substrate layer.

\* \* \* \* \*